Feb. 4, 1947.   G. E. DATH   2,415,164
FRICTION SHOCK ABSORBER
Filed Feb. 23, 1944   2 Sheets-Sheet 1
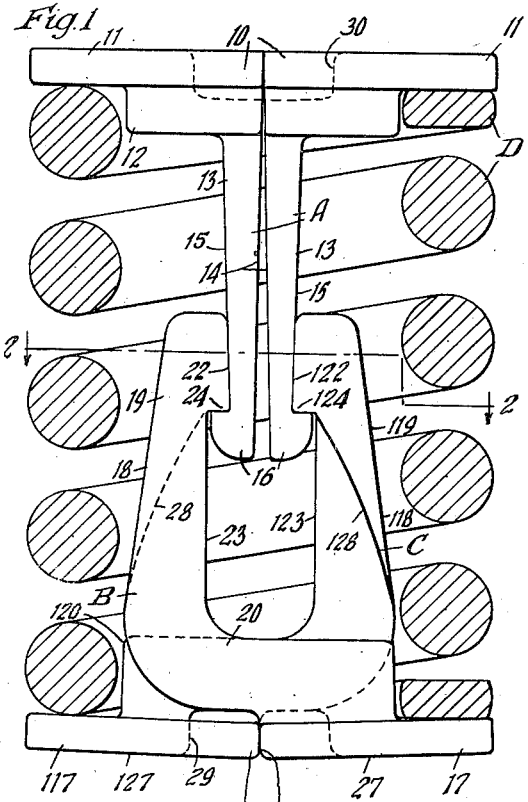
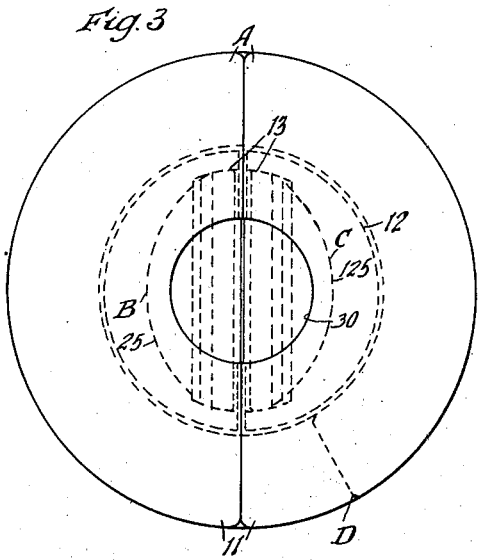
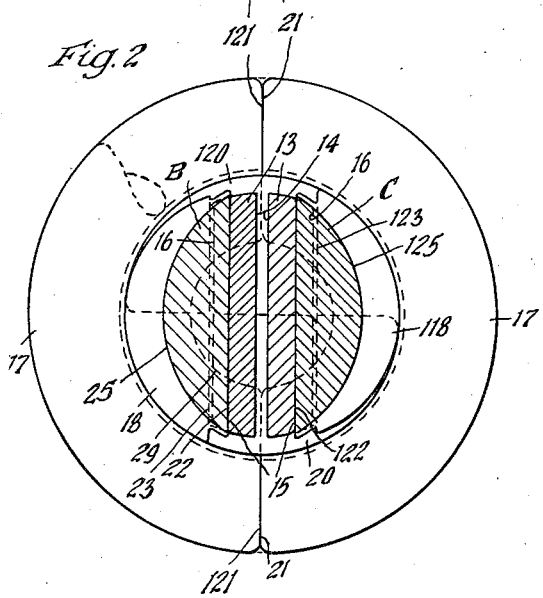
Inventor
George E. Dath
By Henry Fuchs.
Atty.

Feb. 4, 1947. G. E. DATH 2,415,164
FRICTION SHOCK ABSORBER
Filed Feb. 23, 1944 2 Sheets-Sheet 2
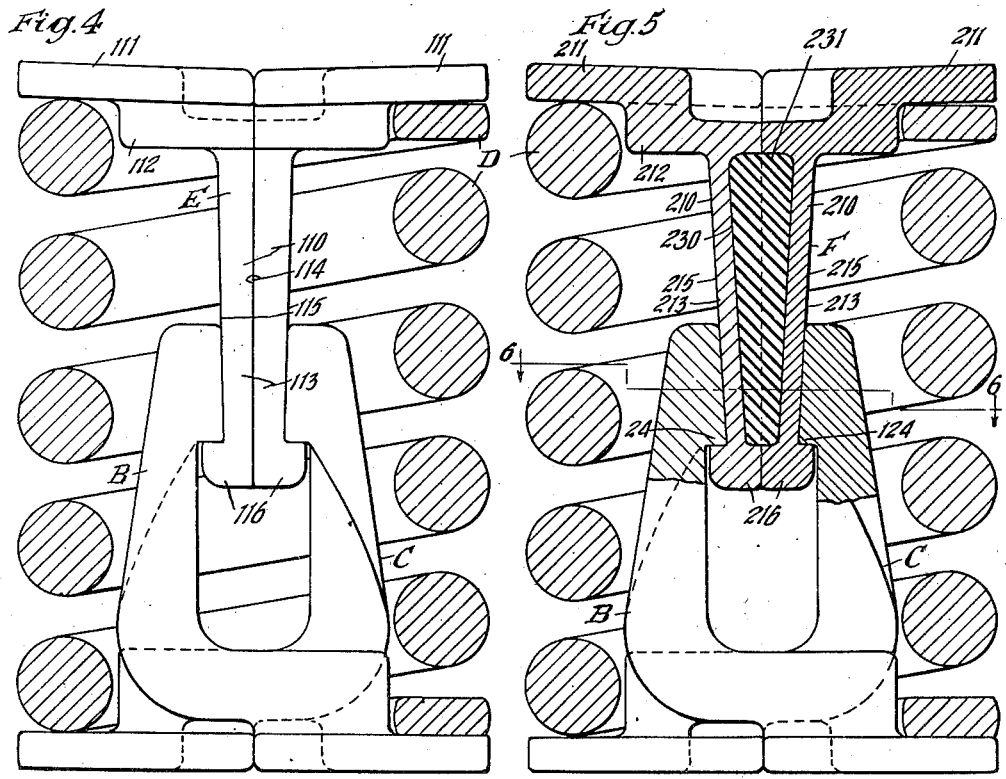
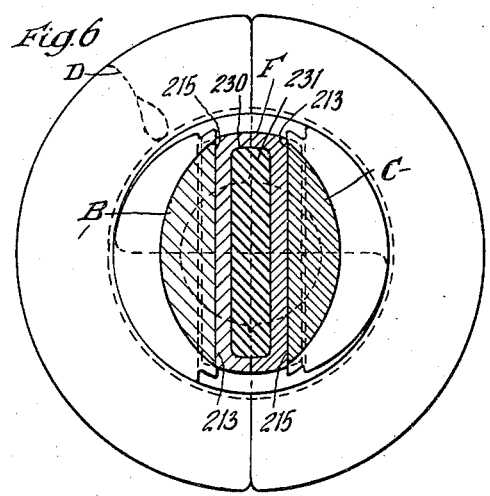
Inventor
George E. Dath
By Henry Fuchs
Atty.

Patented Feb. 4, 1947

2,415,164

UNITED STATES PATENT OFFICE 2,415,164

FRICTION SHOCK ABSORBER

George E. Dath, Chicago, Ill., assignor to W. H. Miner, Inc., Chicago, Ill., a corporation of Delaware Application February 23, 1944, Serial No. 523,498

10 Claims. (Cl. 267—9)

This invention relates to improvements in friction shock absorbers, especially adapted for snubbing or dampening the action of springs of railway car trucks.

One object of the invention is to provide in a friction shock absorber, comprising a tapered friction post, cooperating, tiltable friction shoes slidably engaging the post, and spring means opposing relative lengthwise movement of the shoes and post, and yieldingly resisting tilting of the shoes away from the post, means for compensating for variation in relative inclination of the friction surface of the shoes and post as the mechanism is being compressed.

A more specific object of the invention is to provide a mechanism as specified in the preceding paragraph, wherein the post is split to provide adjustability of the friction surfaces thereof to compensate for variations in inclination of the tiltable friction shoes during compression of the mechanism.

A still further object of the invention is to provide a friction shock absorber comprising a tapered friction post, a pair of tiltable friction shoes having sliding engagement with the post, and a coil spring surrounding the post and yieldingly opposing relative lengthwise movement of the post and shoes and tilting movement of said shoes, wherein the friction post is split lengthwise to permit relative tilting of the sections thereof to provide adjustment of the friction surfaces of the post to changes in inclination of the friction surfaces of the shoes during compression of the mechanism.

Other objects of the invention will more clearly appear from the description and claims hereinafter following.

In the drawings forming a part of this specification, Figure 1 is an elevational view of my improved shock absorber, the spring of the same being shown in vertical section. Figure 2 is a transverse horizontal sectional view, corresponding substantially to the line 2—2 of Figure 1. Figure 3 is a top plan view of Figure 1. Figure 4 is a view similar to Figure 1, illustrating another embodiment of the invention. Figure 5 is a transverse vertical sectional view of still another embodiment of the invention. Figure 6 is a transverse horizontal sectional view, corresponding substantially to the line 6—6 of Figure 5.

Referring first to the embodiment of the invention illustrated in Figures 1, 2, and 3, my improved shock absorber comprises broadly a split friction post A, two friction shoes B and C; and a spring resistance D.

The friction post A is longitudinally split comprising a pair of counterpart sections 10—10. Each section 10 of the post A includes a semi-circular platelike follower section 11, having a downwardly offset boss portion 12 thereon, which is also of semi-circular outline and has its diametrical inner edge aligned with the diametrical inner edge of the section 11. Each section 10 of the post A further includes a usbstantially flat platelike member 13 depending from the boss 12 of the follower section 11. Each post A is thus of L-shaped form, the platelike follower 11 thereof forming a lever arm with which the spring D cooperates. Each plate member 13 has flat, longitudinally extending surfaces 14 and 15 on the inner and outer sides thereof, the outer surface 15 being one of the friction surfaces of the split post A. The two sections 10—10 of the post A have the diametrical inner side edges of their semi-circular platelike follower sections 11—11 in abutment, and have the platelike members thereof diverging in downward direction, as clearly shown in Figure 1, whereby the sections 10—10 are spaced apart at their lower ends. As will be clear upon reference to Figures 1, 2, and 3 of the drawings, the semi-circular platelike follower sections 11—11 together define a substantially circular follower disc, and the bosses 12—12 a substantially cylindrical boss, and the two plate-like members 13—13 together form the friction post member proper of the post A. The friction post member proper is tapered toward its lower end, that is, the friction surfaces 15—15 of the plate members 13—13 of the post converge downwardly. Thus, the split friction post A presents a downwardly tapered formation. Each plate member 13 of the post A is provided with a laterally outwardly projecting stop lug 16 at its lower end, the split post thus having, in effect, an enlarged head at the lower end thereof.

The upper surfaces of the platelike sections 11—11 lie in a single horizontal plane and bear flatly on the top spring follower plate of the usual cluster of truck springs.

The two friction shoes B and C are identical in design. Referring first to the shoe B, the same comprises a semi-circular platelike base 17 and an arm 18 formed integral with the base. The arm 18 includes a substantially vertical portion 19 and a horizontal portion 20 connecting the portion 19 to the base 17. The horizontal portion 20 extends from the upper side of the base 17 and is located to one side of the center of the mechanism. The shoe B is thus broadly of L-shaped form in elevation, the portion 19 forming the vertical section of the L and the portion 20, together with the base 17, the horizontal section. The base 17 of the L-shaped shoe forms a laterally projecting lever arm which cooperates with the lower end of the spring D. The semi-circular base flange has its diametrical edge face, which is indicated by 21, at the inner side of the shoe. On the inner side, the portion 19 of the arm 18 presents a flat friction surface 22 at the upper end thereof adapted to engage one of the friction surfaces 15 of the split post A, and correspondingly inclined to said surface 15.

Below the surface 22, the inner side of the shoe is cut out, as indicated at 23, thereby providing a horizontal shoulder 24, adapted to be engaged by one of the lugs 16 of the post to limit lengthwise separation of the post and shoe. The outer side of the shoe is inclined downwardly and inwardly and the surface of said outer side is transversely rounded, or curved, said outer side thus presenting a conical surface 25.

Referring to the friction shoe C, which as hereinbefore stated is identical with the shoe B, the semi-circular platelike base or lever arm is indicated by 117, the arm by 118, the vertical and horizontal portions of the arm 118 by 119 and 120, respectively, the diametrical side edge of the base 117 by 121, the friction surface of the arm 118 by 122, the cut-out inner side of the arm 118 and the shoulder thereof by 123 and 124, and the conical outer surface of the arm 118 by 125.

The friction shoes B and C are disposed at opposite sides of the post A with the friction surfaces 22 and 122 thereof engaging the friction surfaces 15—15 of the post, the shoe B being disposed at the left hand side, and the shoe C at the right hand side of the post, as seen in Figure 1. The semi-circular base plates or lever arms 17 and 117 of the shoes B and C are in abutment with each other along their diametrical inner edges, the plate 17 of the shoe B being disposed at the right hand side, and the plate 117 of the shoe C being disposed at the left hand side of the mechanism, as seen in Figure 1. The underneath surfaces of the base plates or lever arms 17 and 117, which surfaces are indicated by 27—127, are inclined upwardly in a direction outwardly from the meeting inner edges of the same, the shoes B and C being thus fulcrumed along the inner edges of their base plates 17 and 117. To accommodate the horizontal sections 20 and 120 of the arms 18 and 118 of the shoes B and C, and also facilitate assembling of the parts of the mechanism, the arm or plate section of each shoe is undercut at one side, the shoe B being cut out, as indicated at 28, and the shoe C, as indicated at 128.

At the center of the mechanism, in the base plates 17 and 117 of the two shoes B and C and the platelike followers 11—11 of the sections of the post A, are provided seats to receive the usual centering projections or lugs of the bottom and top spring plates of the truck spring cluster; the plates 17 and 117 being recessed, as indicated at 29, and the followers 11—11, as indicated at 30.

The spring resistance D is in the form of a heavy coil surrounding the post and friction shoes and bears at its top and bottom ends, respectively, on the plates 11—11 and 17—117. The spring D is preferably under initial compression, holds the shoes B and C against the friction surfaces of the split post A, and yieldingly resists contraction of the sections of the post, due to the pressure exerted on the base plates or flanges of the shoes B and C and the sections of the post.

In assembling the parts of my improved friction shock absorber, the shoes B and C are placed side by side with the diametrical inner edges of the follower plates 17 and 117 in abutment with each other, the shoes being in the position shown in Figure 1 and resting on a suitable support. The spring D is then placed around the shoes, resting on the base flanges or plates 17 and 117. The post A, with the sections thereof assembled, is then applied by inserting the same downwardly within the coil of the spring D and entering the lower end thereof between the shoes B and C, the upper ends of which are temporarily held spread apart to admit the enlarged head portion of the post therebetween. The post is forced downwardly against the resistance of the spring D until the stop lugs 16—16 thereof pass the shoulders 24 and 124 of the shoes and engage beneath said shoulders.

My improved friction shock absorber or snubber is substituted for one or more of the spring units of a truck spring cluster, being interposed between the top and bottom spring plates of said cluster.

The operation of the improved shock absorber is as follows: Upon the cluster of springs of the railway car truck being compressed between the spring follower plates of the truck springs, the split friction post A and the friction shoes B and C are moved toward each other, against the resistance of the spring D. Due to the taper of the split post, the shoes B and C are spread apart, being tilted on the inner edges of their semi-circular base flanges or lever arms 17 and 117, against the resistance of the spring D which bears on said base plates. High frictional resistance is thus produced between the friction surfaces of the post and shoes, thereby snubbing the action of the truck springs. As the shoes are tilted outwardly, due to the taper of the split post A, the inclination of the friction surfaces of said shoes necessarily changes. This change in inclination is compensated for by the split arrangement of the post, the sections 10—10 of which are tiltable to align the friction surfaces thereof with those of the shoes so that there will, at all times, be flat engagement between these surfaces. As will be evident, the squeezing action of the shoes on the post forces the sections of the post to tilt by fulcruming action on the inner edges of their platelike followers or lever arms 11—11, to accomplish this adjustment, and the tilting action of the two sections 10—10 of the post is yieldingly resisted by the spring D, which tends to hold the sections of the post spread apart.

Upon the spring follower plates being moved apart during recoil of the truck springs, the expansive action of the spring D restores all of the parts of the normal release position shown in Figure 1, separation of the post and shoes in lengthwise direction being limited by engagement of the stop lugs 16—16 of the post with the shoulders 24 and 124 of the shoes.

Referring next to the embodiment of the invention illustrated in Figure 4, the construction is the same as that illustrated in Figures 1, 2, and 3, with the exception that the split friction post, in the normal position of the parts, does not have the sections thereof spread apart.

The split friction post, which is indicated by E in Figure 4, comprises two like sections 110—110. Each section 110 includes a semi-circular, platelike follower or lever arm 111, similar to the follower or lever arm 11 of the sections 10 of the post A hereinbefore described, having a downwardly offset boss portion 112. Each section 110 of the post E further includes a substantially flat platelike member 113 depending from the boss 112 of the follower section 111. Each plate member 113 has flat surfaces 114 and 115 on the inner and outer sides thereof, the outer surface 115 being one of the friction surfaces of the split post E. The two sections 110—110 of the post E are in face to face contact with each other throughout their lengths, the inner surfaces 114 and 114 thereof being in flat surface contact. The upper or top surfaces of the follower sections or lever arms 111—111 are preferably inclined upwardly and outwardly from the center of the mechanism, as shown in Figure 4, whereby these follower sections or lever arms fulcrum on their outer edges.

The split friction post E is tapered toward its lower end, that is, the friction surfaces 115—115 of the plate members 113—113 converge downwardly. Each plate member 113 of the post E is provided with a laterally outwardly projecting lug 116 at its lower end, the split post thus having, in effect, an enlarged head at its lower end which cooperates with the shoulder of the shoes to limit relative separation of the post and shoes, in the same manner as described in connection with the embodiment of the invention illustrated in Figures 1, 2, and 3.

The friction shoes illustrated in Figure 4 are identical with the shoes B and C hereinbefore described in connection with Figures 1, 2, and 3 and are also indicated by B and C, and the parts thereof are indicated by the same reference characters as used in Figures 1, 2, and 3.

The spring illustrated in Figure 4 is identical with the spring D hereinbefore described in connection with Figures 1, 2, and 3, and is arranged and operates in a similar manner. This spring is also indicated by D in Figure 4.

The operation of the shock absorber illustrated in Figure 4 is the same as the operation of the shock absorber illustrated in Figures 1, 2, and 3, with the exception that during compression of the mechanism variation in inclination of the friction surfaces of the tiltable shoes B and C is compensated for by the sections 110—110 of the post being separated at their upper ends.

Referring next to the embodiment of the invention illustrated in Figures 5 and 6, the construction is the same as that illustrated in Figures 1, 2, and 3, with the exception that the split friction post, in the normal position of the parts, does not have the sections thereof separated, and that a filler element of rubber, under compression, is employed between the sections of the post to spread the same apart.

The friction shoes illustrated in Figures 5 and 6 and the spring resistance employed are identical with the shoes B and C, and the spring D, hereinbefore described, and are also indicated by the same reference characters.

The split post, which is indicated by F in Figures 5 and 6, comprises two like sections 210—210. Each section 210 includes a semi-circular platelike follower 211, similar to the follower 11 of the section 10 of the post F hereinbefore described, and said platelike follower is provided with a downwardly offset boss 212. Each section 210 of the post F further includes a substantially flat platelike member 213, depending from the boss 212 of the follower section 211. Each plate 213 has a flat outer surface 215 forming one of the friction surfaces of the post. The sections 210 are in face to face contact with each other on their inner sides, throughout the lengths of said sections, and the inner side of each plate is recessed, as indicated at 230, to accommodate a block of rubber, which is indicated by 231. The block of rubber 231 is under initial compression and tends to force the two sections of the split post apart. The upper or top surfaces of the follower sections 211—211 are preferably inclined upwardly and outwardly from the center of the mechanism, as shown in Figure 5, whereby the same fulcrum on their outer edges.

The split friction post F is tapered toward its lower end, that is, the friction surfaces 215—215 of the plate members 213—213 converge downwardly.

Each plate member 213 of the post F is provided with a laterally outwardly projecting lug 216 at its lower end, which cooperates with the shoulders 24 and 124 of the shoes B and C to limit longitudinal separation of the shoes and post.

The operation of the shock absorber illustrated in Figures 5 and 6 is the same as that of the construction shown in Figures 1, 2, and 3, with the exception that during compression of the mechanism, variation in inclination of the friction surfaces of the shoes B and C is compensated for by the sections 210—210 of the post being separated at their upper ends, and that spreading apart of said upper ends is effected through the forcible action of the rubber insert or block, which is under initial compression.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a vertically disposed, longitudinally tapered friction post, said post being split lengthwise into two sections, each section having a laterally extending base flange at its upper end; of tiltable friction shoes embracing said post, said shoes having laterally projecting base flanges at their lower ends, said post and shoes being movable lengthwise with respect to each other; and spring means opposing relative longitudinal movement of said post and shoes toward each other, said spring means bearing at its top and bottom ends on the base flanges of the sections of the post and the base flanges of the shoes and yieldingly forcing said shoes against the post.

2. In a friction shock absorber, the combination with a longitudinally tapered post, said post being split lengthwise into two relatively tiltable sections, each section comprising a longitudinally extending member having a laterally projecting base flange at its upper end; of a pair of friction shoes embracing said post, each shoe having a laterally projecting base flange at its lower end, said shoes being mounted for tilting movement toward the post, said post and shoes being slidable lengthwise with respect to each other; and spring means opposing relative longitudinal movement of said post and shoes toward each other lengthwise of the mechanism, said spring means bearing at one end on the flanges of said shoes and at the other end on the flanges of said post sections and yieldingly forcing said shoes against the post and yieldingly resisting relative tilting movement of the sections of said post.

3. In a friction shock absorber, the combination with a longitudinally tapered post, said post being split lengthwise into two relatively tiltable sections, each section comprising a longitudinally extending member having a laterally outwardly projecting flange at its upper end, said sections diverging toward the lower end of the post and being tiltable toward and away from each other; of a pair of friction shoes embracing said post, said shoes having laterally projecting base portions at their lower ends being mounted for tilting movement toward the post, said post and shoes being slidable lengthwise with respect to each other; and spring means opposing relative longitudinal movement of said post and shoes toward each other, said spring means bearing at its top and bottom ends respectively on said flanges of the sections of the post and base portions of the shoes and yieldingly forcing said shoes against the post and yieldingly resisting relative tilting movement toward each other of the sections of said post.

4. In a friction shock absorber, the combination with a longitudinally tapered post, said post being split lengthwise into two relatively tiltable sections, each section having a laterally projecting flange at its upper end; of a block of rubber between said sections of the post, said block being under initial lateral compression between said sections; a part of friction shoes embracing said post, each shoe having a laterally projecting base flange at its lower end, said shoes being mounted for tilting movement toward the post, said post and shoes being slidable lengthwise with respect to each other; and spring means bearing at its top and bottom ends respectively on said flanges of the sections of the post and the base flanges of the shoes opposing relative longitudinal movement of said post and shoes toward each other, and yieldingly forcing said shoes against the post.

5. In a friction shock absorber, the combination with a vertically disposed, tapered friction post, said post being split lengthwise into two sections, each section having a laterally projecting lever arm at its upper end, said sections being separated at the lower end of the post and being tiltable toward each other; of rocking friction shoes embracing said post, each shoe having a laterally projecting lever arm at its lower end, said shoes and post being movable lengthwise with respect to each other; and spring means reacting between the lever arms of said shoes and the lever arms of the sections of the post to oppose relative longitudinal movement thereof toward each other and rock the shoes toward the post and resist rocking movement of the sections of the post toward each other.

6. In a friction shock absorber, the combination with a tapered friction post, split lengthwise into two like sections, said sections being tiltable; of a base flange at the outer end of each of said sections of said post; friction shoes embracing said post, said shoes having laterally outwardly projecting base portions mounted for rocking movement, said shoes and post being movable lengthwise with respect to each other; and spring means opposing longitudinal movement of said post and shoes toward each other, said spring means bearing on the base portions of said shoes and the base flanges of the sections of the post to press said shoes against the post and yieldingly resist rocking movement of the sections of the post with respect to each other.

7. In a friction shock absorber, the combination with a vertically disposed tapered friction post, split lengthwise into two like sections, said sections diverging toward the lower end of the post and being tiltable toward and away from each other; of a base flange at the outer end of each of said sections of said post; friction shoes embracing said post, said shoes having laterally outwardly projecting base portions mounted for rocking movement, said shoes and post being movable lengthwise with respect to each other; and spring means opposing longitudinal movement of said post and shoes toward each other, said spring means bearing on the base portions of said shoes and the base flanges of the sections of the post to press said shoes against the post and yieldingly resist rocking movement of the sections of the post toward each other.

8. In a friction shock absorber, the combination with a tapered friction post, split lengthwise into two like sections, said sections being laterally separable; of a rubber insert between said sections of the post, said insert being under initial lateral compression; base flanges at the outer ends of the sections of said post; friction shoes embracing said post, said shoes having laterally outwardly projecting base portions mounted for rocking movement, said shoes and post being movable lengthwise with respect to each other; and spring means opposing longitudinal movement of said post and shoes toward each other, said spring means bearing on the base portions of said shoes and the base flanges of the sections of the post to press said shoes against the post.

9. In a friction shock absorber, the combination with a longitudinally split tapered friction post, comprising two like sections which are tiltable, each section of the post having a base portion extending laterally therefrom, said base portions having their outer surfaces lying in the same horizontal plane; of tiltable friction shoes embracing said post at opposite sides, each shoe having a base portion extending laterally therefrom, said base portion having a fulcrum portion at its inner end, said shoes and post being slidable lengthwise with respect to each other; and spring means opposing relative movement of the shoes and post toward each other, said spring bearing on the base portions of said post and shoes to resist tilting movement of said shoes and of the sections of the post.

10. In a friction shock absorber, the combination with a pair of tiltable plate members rockable toward and away from each other, each plate member having a base portion extending laterally outwardly therefrom; of tiltable friction shoes embracing said plate members therebetween, each shoe having a base portion extending laterally therefrom, said base portion having fulcrum means at its inner end, said shoes being slidable lengthwise with respect to said plates; and spring means opposing relative sliding movement of the plates and shoes toward each other, said spring bearing on the base portions of said shoes and plates respectively to resist tilting movement of said plates and shoes.

GEORGE E. DATH.

REFERENCES CITED

The following references are of record in the file of this patent:

UNITED STATES PATENTS

| Number | Name | Date |
| --- | --- | --- |
| 1,689,449 | O'Conner | Oct. 30, 1928 |
| 1,442,893 | Lewis | Jan. 23, 1923 |
| 488,474 | Gibbs | Dec. 20, 1892 |
| 904,490 | Lukens | Nov. 17, 1908 |
| 1,127,657 | McCormick | Feb. 9, 1915 |
| 1,940,446 | Clark | Dec. 19, 1933 |
| 2,049,709 | Lindeman | Aug. 4, 1936 |
| 2,073,761 | Shafer | Mar. 16, 1937 |
| 2,216,231 | Dentler | Oct. 1, 1940 |